(12) United States Patent
Bellasalma

(10) Patent No.: US 6,527,211 B1
(45) Date of Patent: Mar. 4, 2003

(54) BLADE AND SPRING FIBER CHOPPER

(75) Inventor: Jay Bellasalma, Yorba Linda, CA (US)

(73) Assignee: Masco Corporation, Taylor, MI (US)

( * ) Notice: Subject to any disclaimer, the term of this patent is extended or adjusted under 35 U.S.C. 154(b) by 2 days.

(21) Appl. No.: 09/923,475

(22) Filed: Aug. 7, 2001

(51) Int. Cl.⁷ .............................................. B02C 18/18
(52) U.S. Cl. ........................ 241/222; 241/235; 241/294
(58) Field of Search ................... 83/347, 913; 241/235, 241/242, 294, 222

(56) References Cited

U.S. PATENT DOCUMENTS

| | | | |
|---|---|---|---|
| 3,865,164 A | * | 2/1975 | Sybertz ....................... 144/172 |
| 3,921,270 A | | 11/1975 | Upton |
| 3,992,967 A | * | 11/1976 | Fram ........................... 30/128 |
| 4,180,906 A | | 1/1980 | May |
| 4,287,799 A | | 9/1981 | Fujita et al. |
| 4,373,650 A | | 2/1983 | Gay |
| 5,271,301 A | | 12/1993 | Hiraoka et al. |
| 5,328,494 A | | 7/1994 | Kelman et al. |
| 5,697,560 A | | 12/1997 | Bennett |
| 5,791,587 A | | 8/1998 | Pasquale |
| 5,806,387 A | | 9/1998 | Jander |
| 5,857,370 A | | 1/1999 | Grenz et al. |
| 6,152,657 A | | 11/2000 | Packer et al. |
| 6,168,355 B1 | | 1/2001 | Wardell |

* cited by examiner

Primary Examiner—Mark Rosenbaum
(74) Attorney, Agent, or Firm—Emch, Schaffer, Schaub & Porcello Co., L.P.A.

(57) ABSTRACT

This fiber chopper overcomes the disadvantages of the previous cutting rollers for chopping continuous filaments. The apparatus includes a means for feeding continuous fibers to a chopping roller. A spring holds the cutting blades on the chopping roller. The filaments pass between the chopping roller and a feed roller for chopping.

13 Claims, 2 Drawing Sheets

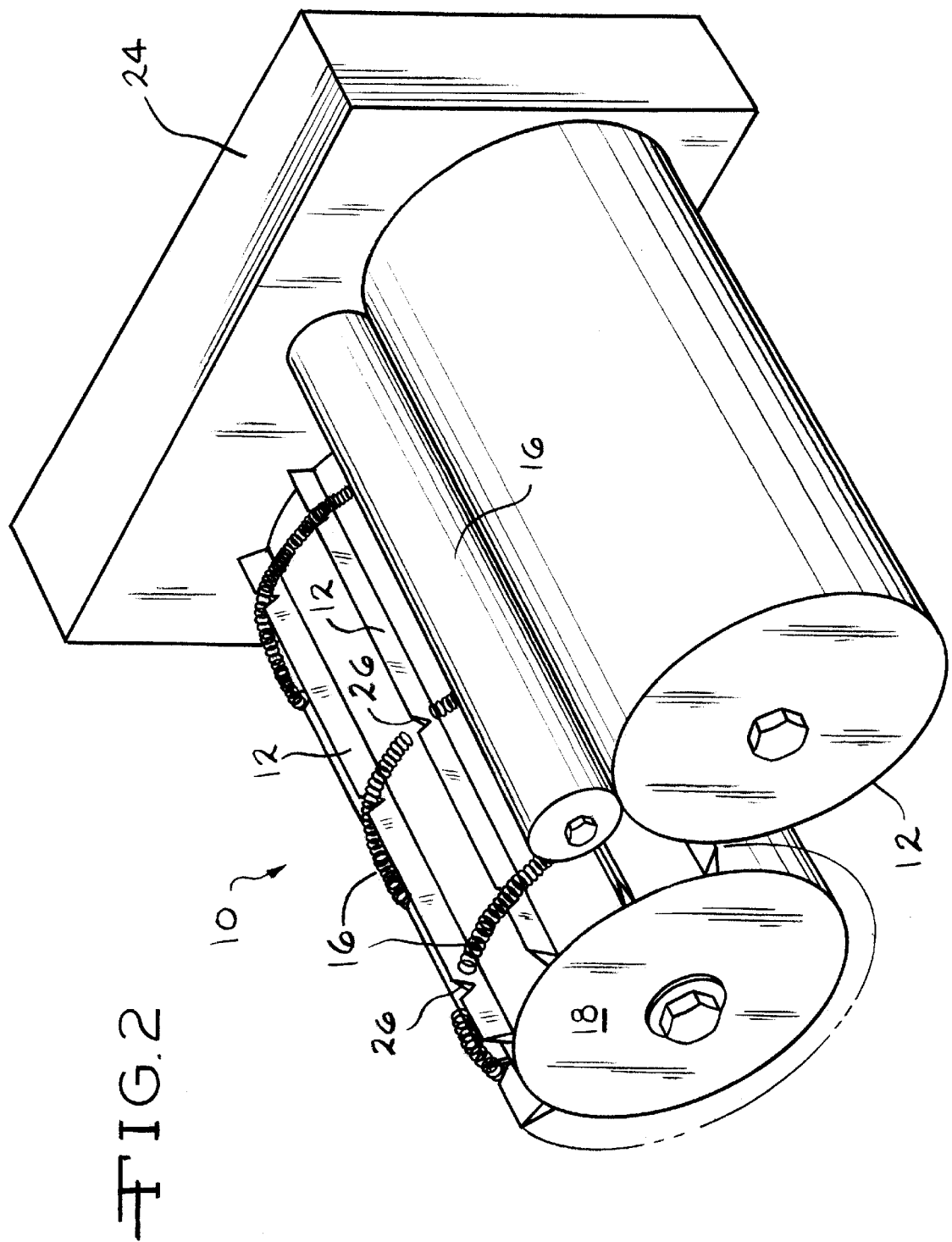

BLADE AND SPRING FIBER CHOPPER

TECHNICAL FIELD

This invention relates to an apparatus and process for chopping continuous fibers into discrete fiber lengths. More specifically, the apparatus uses a unique combination of cutting blades and springs to chop the discrete fiber lengths.

BACKGROUND OF THE INVENTION

Fiber choppers typically use cutting rollers to break continuous rovings into individual short fiber lengths. These choppers use a hard rubber back up roll as an anvil which cooperates with the cutting roller carrying one or more transversely extending blades. The back up roller and cutting roller cooperate to chop a discrete fiber length off the continuous roving each time a rotor blade contacts the back up roll.

The industry continues to develop new ways to cut filaments into staple fibers. One apparatus cuts the filaments with a cutting roller having circular cutting disks and disk shaped spacers. A fiber aligner aligns the segments in a transverse direction. A conventional chopper then cuts the segments a second time. Another apparatus uses axially parallel cutting blades held in receiving grooves with retainer strips. These cutting rollers work well for producing chopped fibers such as conventional chopped glass fibers.

Continuous filaments include a single filament or a plurality of filaments in a strand, with the filament having continuous length or substantial length, e.g., greater than one foot. A plurality of filaments is a plurality of segments of a single filament in adjacent relationships, such as occurs when a single filament is wrapped around a bobbin tube. Formation of the filaments also normally involves treating the filaments with a size to enhance the properties of the fiberglass in subsequent operations.

Recent advances, however, in after coatings for continuous filaments make the fibers more difficult to chop. The filaments are stiff and tuff and often have rubbery coatings. Conventional cutting rollers often don't cut the stiff fibers. Results often leave the fibers bent or kinked. The typical result is not the clean cut industry desires. Further, the cutting rollers often break blades or do not penetrate the rubbery coatings.

BRIEF SUMMARY OF THE INVENTION

I have developed a process and apparatus which overcomes the disadvantages of the previous cutting rollers for chopping continuous filaments. My apparatus for chopping continuous fibers into discrete fiber lengths includes a plurality of cutting blades mounted on a chopping roller. A spring holds the blades on the roller. The apparatus also includes at least one means for feeding at least one continuous fiber to the cutting roller. A feed roller is positioned parallel to the chopping roller. Preferably, the continuous fiber passes between the chopping roller and feed roller (for chopping the continuous fibers into discrete fiber lengths). The feed roller forms a nip with the cutting roller. Preferably, the spring is a spring washer. Preferably, the apparatus also includes an idler roller parallel to the feed roller. The idle roller forms a nip with the feed roller. Preferably the feed roller has a hard cutting surface.

BRIEF DESCRIPTION OF THE DRAWINGS

FIG. 2 is a schematic side view of the apparatus.

DETAILED DESCRIPTION OF THE INVENTION

Figure 1:
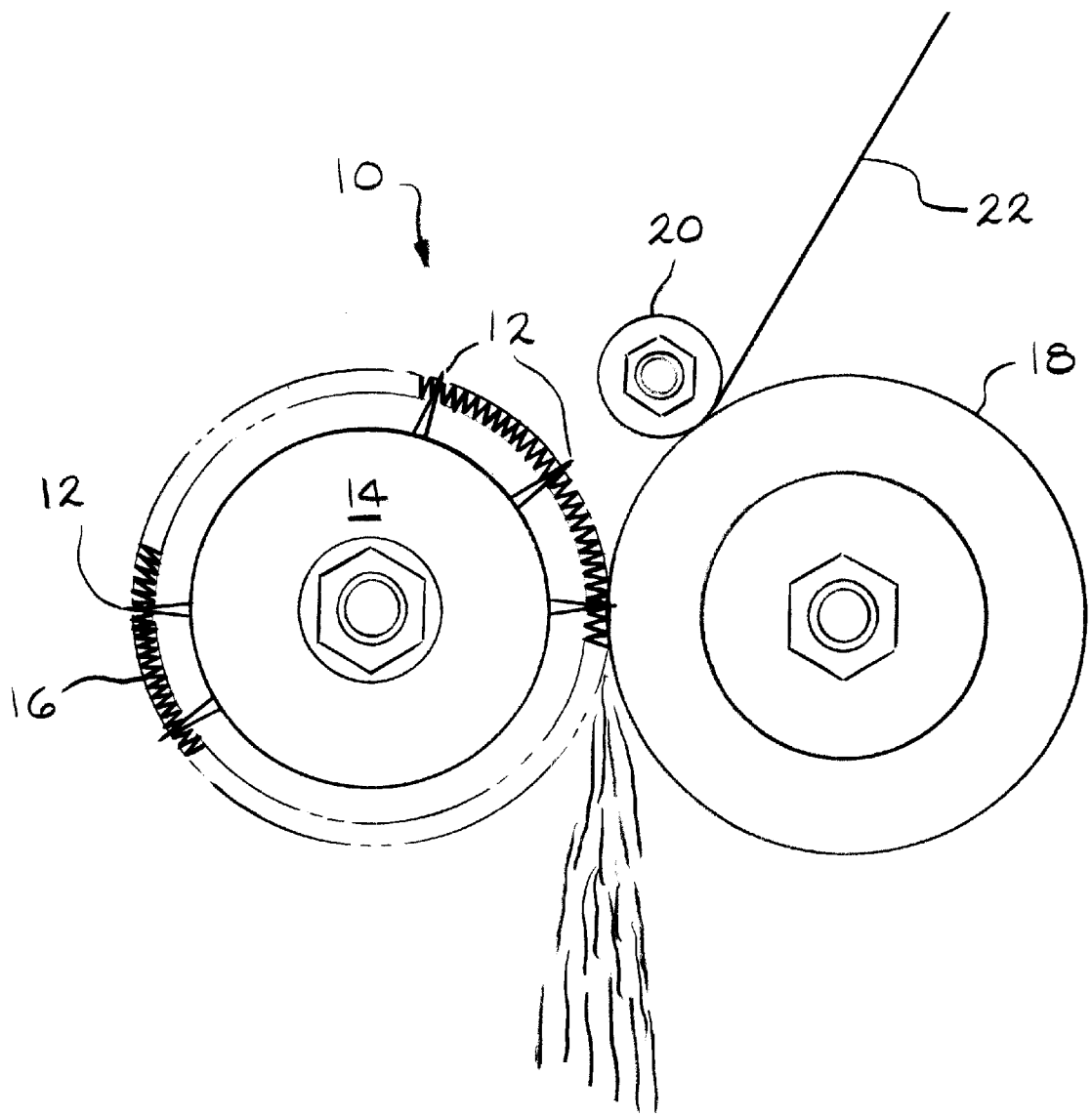
FIG. 1 is an end view of the apparatus for continuously chopping fiber strands into chopped fibers.

The apparatus of this invention chops continuous fibers into discrete fiber lengths. The chopper comprises at least one means that feeds at least one continuous fiber to a cutting roller.

FIGS. 1 and 2 shows apparatus 10 for chopping continuous fibers into chopped fibers. Apparatus 10 includes cutting blades 12 mounted on cutting roller 14. Spring washer 16 holds blades 12 on roller 14. Feed roller 18 is positioned parallel to chopping roller 14. Roller 18 is in nip alignment with roller 14. Idler roller 20 preferably is in nip alignment with roller 18. Strand 22 passes between roller 20 and roller 18 as well as between roller 18 and roller 14.

FIG. 2, in addition, shows drive means 24 for rotating rollers 12 and 18. Drive 24 typically is a motor with shafts engaging rollers 12 and 18. FIG. 2 also shows spring washer 16 fastening blades 12 to roller 14 through slots 26. Spring washer 16 may be a flat spring or a coiled spring as shown in FIG. 2. Typically, the spring band engages the notches of the blades and circumscribes the chopping roller.

Cutting blades 12 may be made of a wide variety of materials. Any of the blades in this invention may be made of polycrystalline diamond (CBN) or polycrystalline cubic boron nitride (PcBN) and may be manufactured using conventional methods. The blades also may be made of diamond, other synthetic diamonds, stainless steel and the like.

The blades also may be formed of various materials that will withstand the forces of high speed rotation and cutting. Suitable materials include steel, aluminum, ceramic, titanium and the like. The width of the blades will approximate the length of the fiber to be cut, e.g., from about 0.032 inch to above 2.0 inch, and preferably from about 0.0625 inch to about 1.0 inch.

Spring washer 16 generally is made from a spring steel such as 1075 spring steel having a thickness ranging from 0.01 inch to 0.10 inch, preferably about 0.03 inch. The spring steel and thickness may vary depending upon speed and chopping conditions.

This unique chopper was designed for processing reinforcements having a specific coating thereon. Preferably, the mixture developed for coating glass fiber reinforcements for thermoset resins such as polyesters. First, the glass is coated and dried. After drying, the roving then is wrapped around chilled mandrels and chopped into an appropriate length.

These after coated reinforcements are described in U.S. patent application Ser. No. 09/829,095, filed Apr. 9, 2001 and herein incorporated by reference.

In addition to these embodiments, persons skilled in the art can see that numerous modifications and changes may be made to the above invention without departing from the intended spirit and scope thereof.

I claim:

1. An apparatus for chopping continuous fibers into discrete fiber lengths comprising:

a chopping roller having a plurality of cutting blades mounted thereon;

a spring engaging the cutting blades and holding the cutting blades on the roller; wherein the spring is a circular band circumscribing the chopping roller, and a feeder roller positioned parallel to the chopping roller.

2. An apparatus according to claim 1 wherein the feed roller forms a nip with the chopping roller.

3. An apparatus according to claim 1 wherein the spring is a spring washer.

4. An apparatus according to claim 1 including an idler roller parallel to the feed roller.

5. An apparatus according to the claim 4 wherein the idler roller forms a nip with feed roller.

6. An apparatus according to claim 1 wherein the blades are made of synthetic diamond.

7. An apparatus according to claim 1 wherein the blades have a width ranging from 0.125 inch to 2.0 inches.

8. An apparatus according to claim 1 wherein the spring is made of spring steel.

9. An apparatus according to claim 1 wherein the spring has a thickness ranging from 0.01 to 0.10 inch.

10. An apparatus according to claim 1 wherein the spring is a flat band.

11. An apparatus according to claim 1 wherein the spring is a coiled band.

12. An apparatus according to claim 1 wherein the cutting blades include at least one notch and the spring engages the notch.

13. An apparatus for chopping continuous fibers into discrete fiber lengths comprising:

a chopping roller having a plurality of cutting blades mounted thereon;

a spring engaging the cutting blades and holding the cutting blades on the roller, wherein the cutting blades include at last one notch and the spring engages the notch, and a feeder roller positioned parallel to the chopping roller.

* * * * *